May 21, 1940.   Y. SEKELLA   2,201,304
GEAR CHANGING MECHANISM
Filed Oct. 1, 1939   2 Sheets—Sheet 1
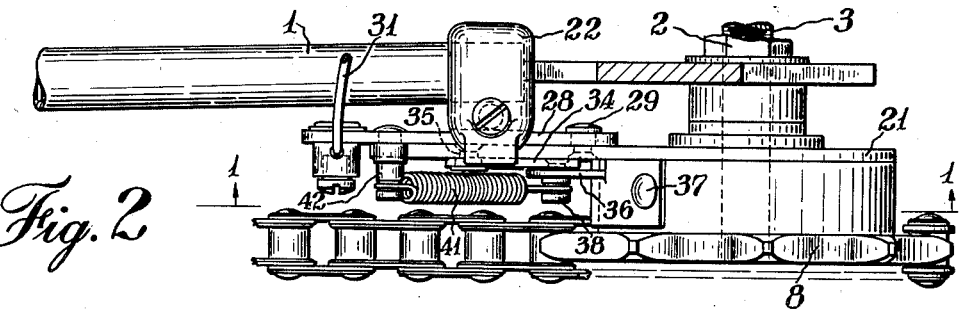
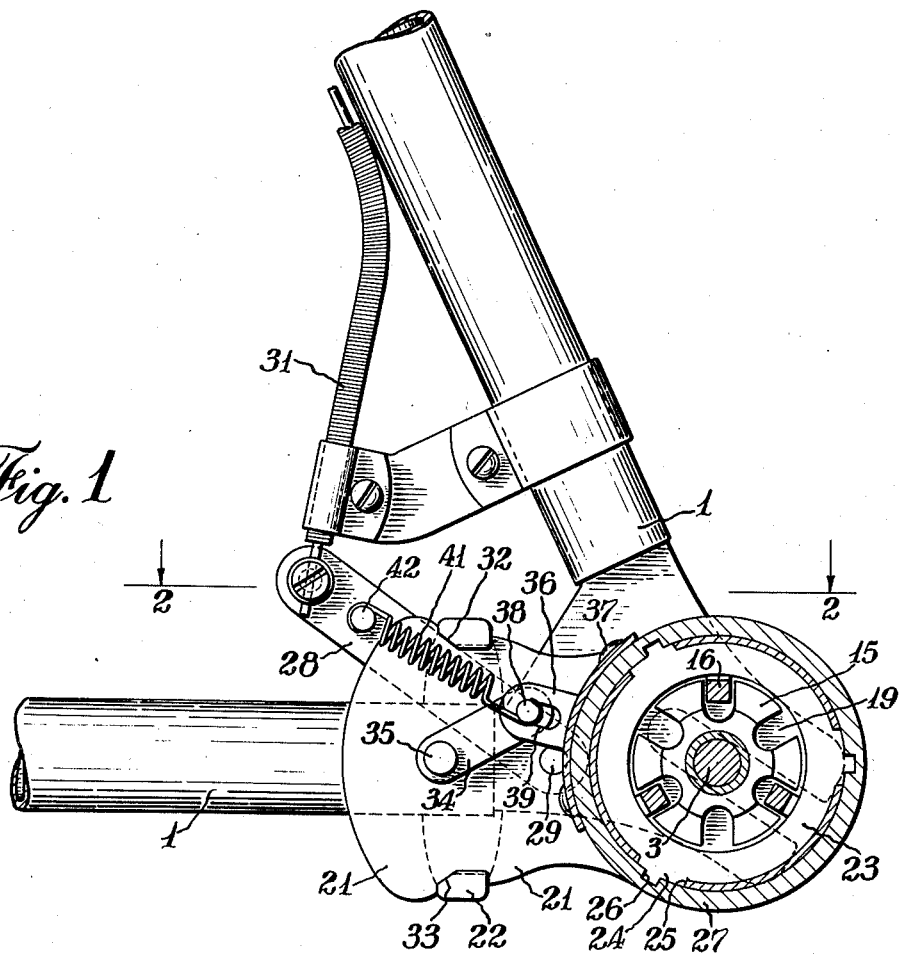
INVENTOR.
Youston Sekella
BY
Clinton A James
ATTORNEY.
Witness:
Burr W. Jones

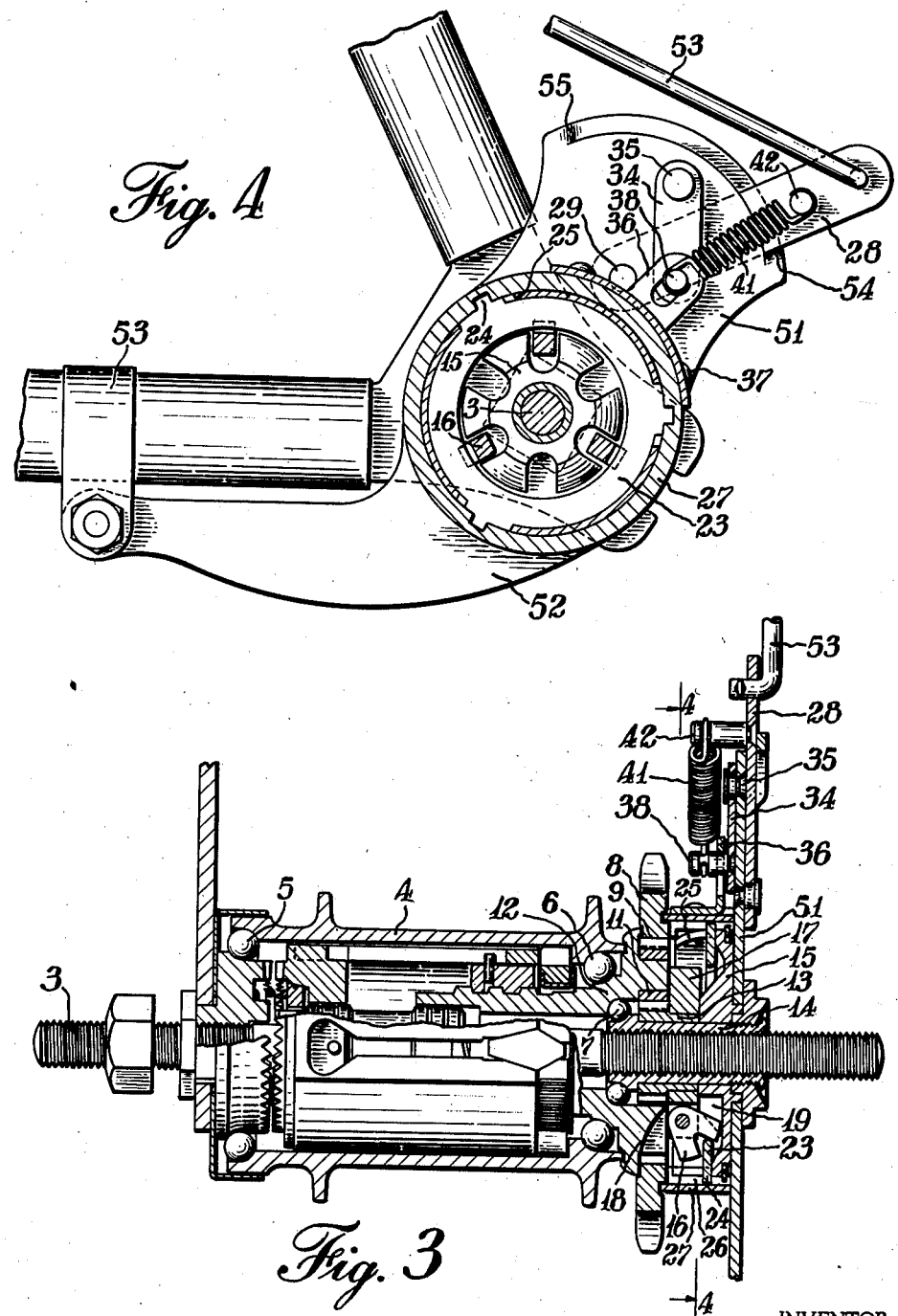

Patented May 21, 1940

2,201,304

UNITED STATES PATENT OFFICE 2,201,304

GEAR CHANGING MECHANISM

Youston Sekella, Elmira Heights, N. Y., assignor to Bendix Aviation Corporation, South Bend, Ind., a corporation of Delaware Application October 1, 1938, Serial No. 232,811

8 Claims. (Cl. 74—290)

The present invention relates to gear changing mechanism for velocipedes and more particularly to a snap-action operating means for controlling multi-speed gearing for bicycles.

Various forms of change speed gearing have been adapted for use in the propulsion of velocipedes such as bicycles, such devices usually making use of shiftable gears or shiftable keying means in order to secure the various gear ratios. The successful operation of such devices entails shifting means for the gears or the keys which will make the desired shifts quickly and smoothly and with provisions for yielding elastically if the shifting action is momentarily impeded.

It is an object of the present invention to provide a novel shifting device for bicycle gearing which is efficient and reliable in operation while being simple and economical in construction.

It is another object to provide such a device which is arranged to shift a two-speed gear to either of its operating positions.

It is another object to provide such a device which incorporates a yielding means serving to effect the shift quickly and gently and thereafter to maintain the parts in shifted position.

It is a further object to provide such a device which is mounted within the frame of the vehicle so as not to project therefrom.

It is another object to provide such a device which is small and compact and performs its functions with short arcuate travel of the moving parts.

Further objects and advantages will be apparent from the following description taken in connection with the accompanying drawings in which:

Fig. 1 is a sectional view of a two-speed bicycle gear embodying a preferred form of the invention, the section being taken substantially on the line 1—1 of Fig. 2;

Fig. 2 is a plan view of the same partially broken away;

Fig. 3 is a vertical substantially mid-sectional view of a conventional bicycle brake embodying the present invention, the elements of the bicycle frame being omitted for the sake of clarity; and Fig. 4 is a sectional view taken substantially on the line 4—4 of Fig. 3, showing an alternative arrangement of anchor plate and torque arm.

In Figs. 1 and 2 of the drawings there is illustrated a portion 1 of the rear forks of a bicycle frame in which is rigidly mounted as by means of a nut 2 an axle member 3. A wheel hub 4 (Fig. 3) is journalled by means of bearings 5, 6 and 7 on the axle 3 and is arranged to be actuated by a sprocket 8 by means of two-speed planetary gearing. As here illustrated, the gearing comprises an orbit gear 9 formed in the sprocket 8, a plurality of planet pinions 11 journalled on a planet carrier 12, and a sun gear 13 journalled on an adjustable bearing member 14 and meshing with the planets 11.

Means are provided for alternatively locking the sun gear 13 to the planet carrier 12 or to an anchor member 15 in the form of swinging key members 16 pivotally mounted on a carrier 17 fixed to the sun gear 13 and having furcations adapted to alternatively engage recesses 18 in the planet carrier or recesses 19 in the anchor member 15.

The anchor member 15 has fixed thereto or formed integrally therewith a plate 21 (Figs. 1 and 2) arranged to extend forwardly from the axle 3 and to be rigidly attached to the fork 1 of the frame by suitable means such as a clamping member 22.

Means are provided for shifting the swinging keys 16 comprising a ring 23 extending between the furcations of the keys 16 and having peripheral lugs 24 extending radially through cam slots 25 (Fig. 3) in the anchor member 15 and into longitudinal grooves 26 in a shifting member 27 journalled on the anchor member 15. Oscillation of the shifting member 27 thus causes the ring 23 to move longitudinally and thereby swing the keys 16 from one operative position to the other.

According to the present invention, means are provided for moving the shifting member 27 from one operative position to the other by a yielding snap-action device which causes the shift to be made easily and quickly and without undue strain on the parts or lost motion in the transmission. As illustrated in Figs. 1, 2 and 3, this shifting means comprises a lever 28 pivoted at 29 on the anchor plate 21 and arranged to be manually operated by any suitable means such as a Bowden mechanism 31 through an arc of travel conveniently limited by abutment surfaces 32 and 33 of the anchor clamp 22. A link 34 is pivoted at 35 to the anchor plate 21 at a point radially outward from the pivot 29 of lever 28, and is provided with a sliding pivotal connection with an arm 36 fixed as indicated at 37 to the shifting member 27. The sliding pivotal connection here illustrated comprises a pin 38 in the free end of link 34 which traverses a slot 39 in the arm 36. A spring 41 is connected at one end to the pin 38 and at its other end to a pin 42 adjacent the free end of the lever 28.

The abutments 32 and 33 are arranged to confine the travel of the lever 28 to an arc which is bisected by a line radial to the bicycle hub and its associated parts, passing through the pivotal point 29 of the lever. The pivot 35 of link 34 is in the same radial plane as the pivot 29, and the length of the slot 39 in arm 36 is such as to cause the link 34 to limit the rotary movement of the shifting member 27 to an arc of substantially less angular extent than the scope of movement of the lever 28.

It will thus be seen that with the parts in the operative position illustrated in Fig. 1, tension of the spring 41 yieldingly maintains the shifting member 27 in its clockwise rotated position with a force that is greatly augmented by the effect of the link 34 which, by reason of its angularity, firmly maintains the shifting member in this position. When the lever 28 is moved down against the abutment 33 by the Bowden mechanism 31, however, the spring 41 acts on both the shifting member 27 and link 34 to cause the shifting member to rotate counterclockwise to a position similarly defined by the engagement of the pivot 38 in the end of the slot 39, in which position the shifting member 27 is firmly maintained by the cooperation of the link 34 in an identical manner.

In the operation of the device, when the parts are in the positions illustrated in Figs. 1, 2 and 3, the shifting member 27 is so positioned that the ring 23 maintains the key members 16 in engagement with the recesses 19 in the anchor member. The sun gear 13 is thus prevented from rotation, and the planet carrier 12 is rotated by the sprocket 8 at reduced speed. When the lever 28 is swung to its lower position, the spring 41 is placed under increased tension and rotated about the pivot 38 until it passes through the dead center position and causes the shifting member 27 to be quickly rotated to its opposite position. This rotation causes the ring 23 to move over to its high speed position, thus disengaging the keys 16 from the recesses 19 in the anchor member and causing them to engage with the recesses 18 in the planet carrier. Since the keys 16 are actuated by the tension of spring 41, they are snapped into full engagement with the recesses 18 immediately upon alignment therewith. The sun gear is thus locked to the planet carrier so that the gearing rotates as a unit and the planet carrier is locked to the driving sprocket 8.

It will be understood that the number of keys 16 and recesses 18 and 19 may be varied as deemed desirable. In the structure as illustrated there are three keys 16, three recesses 18, and six recesses 19, which arrangement has been found satisfactory in respect to mechanical strength and limitation of lost motion.

Since the transmission of rotation and braking force from the planet carrier to the wheel hub forms no part of the present invention, it is believed to be unnecessary to describe the same further than to state that these fuctions are accomplished in the manner described in the patent to Morrow 906,149.

In Fig. 4 of the drawings there is illustrated an embodiment of the invention in which the anchor plate 51 is arranged to extend rearwardly and above the fork of the bicycle frame, and is provided with a torque arm 52 extending beneath the fork and attached thereto by means of a clamp 53.

The shifting mechanism is the same as in the embodiment previously described, the elements thereof being similarly numbered, but the operating lever 28 is in this case actuated by a manually operable rod 53, and its arc of movement is limited by abutments 54 and 55 formed integrally as shoulders on the anchor plate 51.

The operation of the shifting mechanism and the gearing in this embodiment of the invention is the same as that previously described.

Although but two embodiments of the invention have been shown and described in detail, it will be understood that other embodiments are possible and various changes may be made in the dimensions and arrangements of the parts without departing from the spirit of the invention as defined in the claims appended hereto.

What is claimed is:

1. In a change speed gear for velocipedes and the like, shifting means including a rotatably mounted shifting member, a fixed anchor member, a lever pivoted to the anchor member, a link pivoted to the anchor member at a point radially outward from the lever pivot in respect to the axis of the shifting member, a spring connected at its ends adjacent the free ends of the lever and link, and an operative connection between the free end of the link and the shifting member.

2. In a change speed gear for velocipedes and the like, shifting means including a rotatably mounted shifting member, a fixed anchor member, a lever pivoted to the anchor member, a link pivoted to the anchor member at a point radially outward from the lever pivot in respect to the axis of the shifting member, a spring connected at it ends adjacent the free ends of the lever and link, a sliding pivotal connection between the free end of the link and the shifting member, means for limiting the rotary motion of the shifting member to an arc bisected by the radius passing through said fixed pivots, and manually operable means for swinging the lever.

3. Snap-action operating mechanism for a gear shift including a rotatable shifting member, an anchor member, a link and a lever pivoted at one end thereof to the anchor member in overlapping relation, a spring connected at its ends adjacent the free ends of the link and lever, and a lost motion pivotal connection between the free end of the link and the shifting member.

4. Snap-action operating mechanism for a gear shift including a rotatable shifting member, an anchor member, a link and a manually operable lever pivoted at one end thereof to the anchor member in overlapping relation, a spring connected at its ends adjacent the free ends of the link and lever, and a pivotal connection between the free end of the link and the shifting member having freedom for limited relative sliding motion, said anchor member having means for limiting the arcuate movement of the lever.

5. Gear shifting mechanism for velocipedes including a rotatable shifting member, an anchor plate adapted to be fixed to the frame of the vehicle, a manually operable lever and a link pivoted at one end thereof to the anchor plate in radially overlapping relation in respect to the axis of the shifting member, a spring connected at its ends adjacent the free ends of the link and lever, and a limited lost motion pivotal connection between the free end of the link and the shifting member, said anchor plate having shoulders limiting the swinging movement of the lever to an arc bisected by the line passing through the pivotal points of the link and lever.

6. In a two-speed gear for velocipedes or the like, an anchor plate, a shifting member mounted for rotary movement adjacent thereto, an actuating lever pivoted on said anchor plate, a spring connected at its ends to the shifting member and actuating lever, and means for so limiting the arcuate movement of the shifting member as to confine the point of connection of the spring thereto to movement through an arc bisected by a radius of the shifting member passing through the point of attachment of the actuating lever and of substantially less angular extent than the scope of movement of the actuating lever.

7. In a two-speed gear for velocipedes or the like, an anchor plate, a shifting member mounted for rotary movement adjacent thereto, an actuating lever pivoted on said anchor plate, a spring connected at its ends to the shifting member and actuating lever, means for so limiting the arcuate movement of the shifting member as to confine the point of connection of the spring thereto to movement through an arc bisected by a radius of the shifting member passing through the point of attachment of the actuating lever, and means for limiting the swinging movement of the actuating lever to an arc bisected by the same radius and of a substantially greater angular extent than the arc of movement of the shifting member.

8. In combination, a two-speed gear drive for velocipedes including an axle, a hub journalled thereon, a driving sprocket, means including change speed gearing connecting the sprocket and hub, an anchor member rigidly mounted on the axle, a shifting member for the gearing rotatably mounted on the axle adjacent the anchor member, and manually operable means for moving the shifting member including a link and a lever pivoted at one end thereof on the anchor member in overlapping relation, a spring pivoted at its ends adjacent the free ends of the link and lever, and a pivotal connection between the free end of the link and the shifting member having freedom for limited relative sliding motion.

YOUSTON SEKELLA.